United States Patent
Van Dyke et al.

(10) Patent No.: US 8,370,109 B2
(45) Date of Patent: Feb. 5, 2013

(54) MACHINE VIBRATION BASELINE SYNTHESIZER

(75) Inventors: David J. Van Dyke, Bainbridge Island, WA (US); William A. Watts, Bainbridge Island, WA (US); Laurent H. LaPorte, Lynnwood, WA (US)

(73) Assignee: DLI Engineering Corporation, Poulsbo, WA (US)

( * ) Notice: Subject to any disclaimer, the term of this patent is extended or adjusted under 35 U.S.C. 154(b) by 679 days.

(21) Appl. No.: 12/454,519

(22) Filed: May 18, 2009

(65) Prior Publication Data

US 2009/0292505 A1 Nov. 26, 2009

Related U.S. Application Data

(60) Provisional application No. 61/128,125, filed on May 20, 2008.

(51) Int. Cl.
*G06F 11/30* (2006.01)
(52) U.S. Cl. ........ 702/184; 702/182; 702/183; 702/185; 702/189; 702/33; 702/34; 702/35; 702/66; 702/54; 702/56
(58) Field of Classification Search ................... 702/184
See application file for complete search history.

(56) References Cited

U.S. PATENT DOCUMENTS

| 5,691,924 | A | | 11/1997 | Czyzewski et al. |
| 5,875,420 | A | | 2/1999 | Piety et al. |
| 5,922,963 | A | * | 7/1999 | Piety et al. ...................... 73/659 |
| 6,484,109 | B1 | * | 11/2002 | Lofall ............................ 702/56 |
| 6,526,831 | B2 | * | 3/2003 | Ben-Romdhane .............. 73/660 |
| 7,013,210 | B2 | * | 3/2006 | McBrien et al. .............. 701/100 |

OTHER PUBLICATIONS

Computational Systems, Inc. Reference Manual, pp. 2-24 to 2-31; Released to US customers as early as May 19, 2007.

* cited by examiner

*Primary Examiner* — Jonathan C Teixeira Moffat
*Assistant Examiner* — Hyun Park
(74) *Attorney, Agent, or Firm* — Steven P. Koda

(57) ABSTRACT

Machine vibration baselines are synthesized without averaging historical vibration data. Instead machinery configuration information is used, including data about the machine train, the machine's rotating components, and the machine speeds. For each component being considered, a plurality of parameters is identified for deriving baseline portions. The parameters for one component are used to identify baseline vibration amplitude floor values, vibration amplitudes at frequencies corresponding to various harmonics of a rotational speed, and vibration amplitudes corresponding to forcing frequencies and their harmonics/sidebands. Parameters for other components also may be used to identify amplitudes at harmonic frequencies and forcing frequencies.

25 Claims, 7 Drawing Sheets

Figure 5

| Component | One-Pickup Ball | One-Pickup Journal | Two-Pickup Ball | Two-Pickup Journal | Remarks | Potential Fault Codes |
|---|---|---|---|---|---|---|
| Close-Coupled | 0.05 | x | 14.05 | x | Centrifugal Pump | MB & PV, 1X |
| Close-Coupled | 0.03 | x | 14.03 | x | Fan | MB & FB, 1X |
| Close-Coupled | 0.19 | x | 14.19 | x | Centrifugal Compressor | MB & CV, 1X |
| Close-Coupled | 0.15 | x | 14.15 | x | Rotary Gear/Screw Pump | MB & PT, 1X |
| AC Motor | 5.36 | 5.37 | 15.36 | 15.37 | Motor Only Tested | MB, 1XM or 1X |
| AC Motor | 5.06 | 5.07 | 15.06 | 15.07 | Direct Drive | MB, 1XM or 1X |
| AC Motor | 5.36 | 5.37 | 15.36 | 15.37 | Belt Drive | MB, 1XM or 1X |
| AC Motor | 5.36 | 5.37 | 15.36 | 15.37 | Geared | MB, 1XM or 1X |
| AC Motor - w/ VFD | 5.36 | 5.37 | 15.36 | 15.37 | Motor Only Tested | MB, 1XM or 1X |
| AC Motor - w/ VFD | 5.06 | 5.07 | 15.06 | 15.07 | Direct Drive | MB, 1XM or 1X |
| AC Motor - w/ VFD | 5.36 | 5.37 | 15.36 | 15.37 | Belt Drive | MB, 1XM or 1X |
| AC Motor - w/ VFD | 5.36 | 5.37 | 15.36 | 15.37 | Geared | MB, 1XM or 1X |
| DC Motor | 5.96 | 5.97 | 15.96 | 15.97 | Motor Only Tested | 1XM or 1X |
| DC Motor | 5.66 | 5.67 | 15.66 | 15.67 | Direct Drive | 1XM or 1X |
| DC Motor | 5.96 | 5.97 | 15.96 | 15.97 | Belt Drive | 1XM or 1X |
| DC Motor | 5.96 | 5.97 | 15.96 | 15.97 | Geared | 1XM or 1X |
| Coupling | 10.32 | | | | | |
| Drive Belt | 4.11 | | | | | |
| Chain Drive | 4.12 | | | | | |
| Gearbox | 33.01 | | | | Three or more Gear Meshes | BR |

| Component | One-Pickup Ball | One-Pickup Journal | Two-Pickup Ball | Two-Pickup Journal | Remarks | Potential Fault Codes |
|---|---|---|---|---|---|---|
| Gearbox | 13.01 | 13.04 | 13.05 | 13.08 | One or Two Gear Meshes | 1XM, I1-I5, G1-G6, 1X? |
| Gearbox | 13.31 | 13.36 | 13.41 | 13.46 | One Gear Mesh | 1XM, G1, (1XI & G2), 1X? |
| Gearbox | | | | | Two Gear Meshes | |

| Component | Three-Pickup Ball | Three-Pickup Journal | Four-Pickup Ball | Four-Pickup Journal | Remarks | Potential Fault Codes |
|---|---|---|---|---|---|---|
| Gearbox | 13.09 | 13.12 | 13.13 | 13.16 | One Gear Mesh | |
| Gearbox | 13.51 | 13.56 | 13.61 | 13.66 | Two Gear Meshes | |
| Belt - Gearbox | | | | | | 1XJ gearbox input |
| Gearbox - Belt | | | | | | 1XK gearbox output |
| Centrifugal Pump | 2.02 | 2.01 | 12.02 | 12.01 | Supported Rotor | PV, 1XP or 1X |
| Centrifugal Pump | 2.04 | 2.06 | 12.04 | 12.06 | Overhung Rotor | PV, 1XP or 1X |
| Propeller Pump | 2.12 | 2.11 | 12.12 | 12.11 | | PB, 1XP or 1X |

MACHINE VIBRATION BASELINE SYNTHESIZER

FIELD OF THE INVENTION

The present invention generally relates to methods and apparatus for monitoring the condition and reliability of machinery, and more particularly to methods and apparatus for synthesizing vibration profiles of machinery, such as may be used for screening out or troubleshooting faulty machines.

BACKGROUND OF THE INVENTION

Industrial machines may vary in their complexity, but typically include several rotating elements, such as bearings, shafts and gears. Where there is rotation there generally is some degree of machine vibration. Vibration occurs due to imbalance, misalignment of shafts, and bearing wear. Every machine has some level of vibration that is characteristic of its operation. In particular, properly maintained machines are designed to exhibit not more than a reasonable degree of vibration under normal operating conditions. Excessive levels of vibration indicate machine problems that may lead to unsatisfactory operation and eventual breakdown.

Machine malfunction can sometimes be detected by a change in the vibration pattern of a machine. In today's plants where machines are complex and/or large in number, engineers often rely on advanced methods of identifying abnormal levels and patterns of vibration in order to determine the condition of a machine. For example, based upon knowledge of the rotational speed of individual machine elements, machine maintenance personnel can monitor the machine's vibration level at certain characteristic frequencies to acquire an indication of the overall condition of the machine. As the mechanical integrity of a machine element begins to degrade, the vibration level associated with that element changes from its normal characteristic level. To the trained machine maintenance personnel such change may indicate that corrective action will soon be necessary. By implementing a machine monitoring program, the machine's vibration levels can be measured on a regular schedule, and early detection of abnormal machine operation is possible. With such early warning, repair of the machine may be scheduled well before a machine breakdown and the associated work stoppage occurs. In this manner, machine "down-time" may be scheduled well in advance so as to minimize the impact on manufacturing operations.

One challenge in predicting potential failures is determining what vibration characteristics may be considered normal and safe—i.e., what is the machine's normal characteristic level of vibration. Further, what are the variations in vibrations that fall outside the normal and may indicate machine underperformance, component wear, and ultimate machine breakdown. Establishing what is considered "normal" operating vibration signatures for machinery has been historically accomplished by selecting candidate machinery vibration tests from identical machines without mechanical faults, normalizing for speed variations, and numerically averaging them together to obtain an "average" vibration signature. Vibration spectra typically are collected at a number of locations on a given machine. Specific spectral features in the measured data may include harmonic families or difference families, which are associated with certain types of machinery faults.

When a new, identical machine is installed, it may be monitored by comparing its vibration profile with the historical average vibration profile previously obtained for that machine. This methodology is feasible and useful when a large number of historical sets of vibration tests for groups of machines are available. However, it is not feasible when there is a lack of such abundant test data from a variety of machines in various conditions. Furthermore, building average baselines requires sufficient knowledge and experience in machinery vibration signature analysis. In particular, the historical averaging operation is subjective. A user needs to determine whether an acquired candidate set of data is 'averagable'—meaning whether it is good quality data from an apparently fault free machine. Many machine users do not have the skills or experience to judge whether test data is suitable for establishing a baseline.

Accordingly, there is need of an alternative method of obtaining a baseline vibration profile for machines, such as when data for similar machines without faults is not available. Further, there is a need to obtain vibration profiles that effectively define normal and that may be efficiently applied to desired machinery to screen out machines that are faulty or in need of maintenance, and to troubleshoot machines identified as being faulty or in need of maintenance. These and other needs are addressed by the inventions described herein.

SUMMARY OF THE INVENTION

The present invention provides a method and apparatus for synthesizing machinery vibration baseline spectra based upon machinery descriptive information and previously compiled baseline specifications data. The machinery descriptive information may include, for example, machine train data, component data and machine speed data. Baselines for a machine may be derived for a specific test location and specific frequency range without averaging historical vibration data from either one or both of the machine and an identical machine.

A prime component is identified based at least in part on the test location. Baseline specifications data relating to the prime component are used to determine vibration amplitude floor values for portions of the baseline, along with other vibration amplitude values corresponding to various frequencies. The various frequencies may include the rpm associated with the component, harmonics of the rpm, forcing frequencies, and associated forcing frequency harmonic and/or sideband frequencies. Baseline specifications data relating to other components are similarly used to determine amplitude peaks at other frequencies, such as at the respective rpm associated with the other components, harmonic frequencies of the rpm, and in some instances forcing frequencies and associated forcing frequency harmonic and/or sideband frequencies.

The invention will be better understood by reference to the following detailed description taken in conjunction with the accompanying drawings.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 5 is a chart of category codes and potential fault codes for various machine component configurations;

DETAILED DESCRIPTION OF ILLUSTRATIVE EMBODIMENTS

Figure 1:
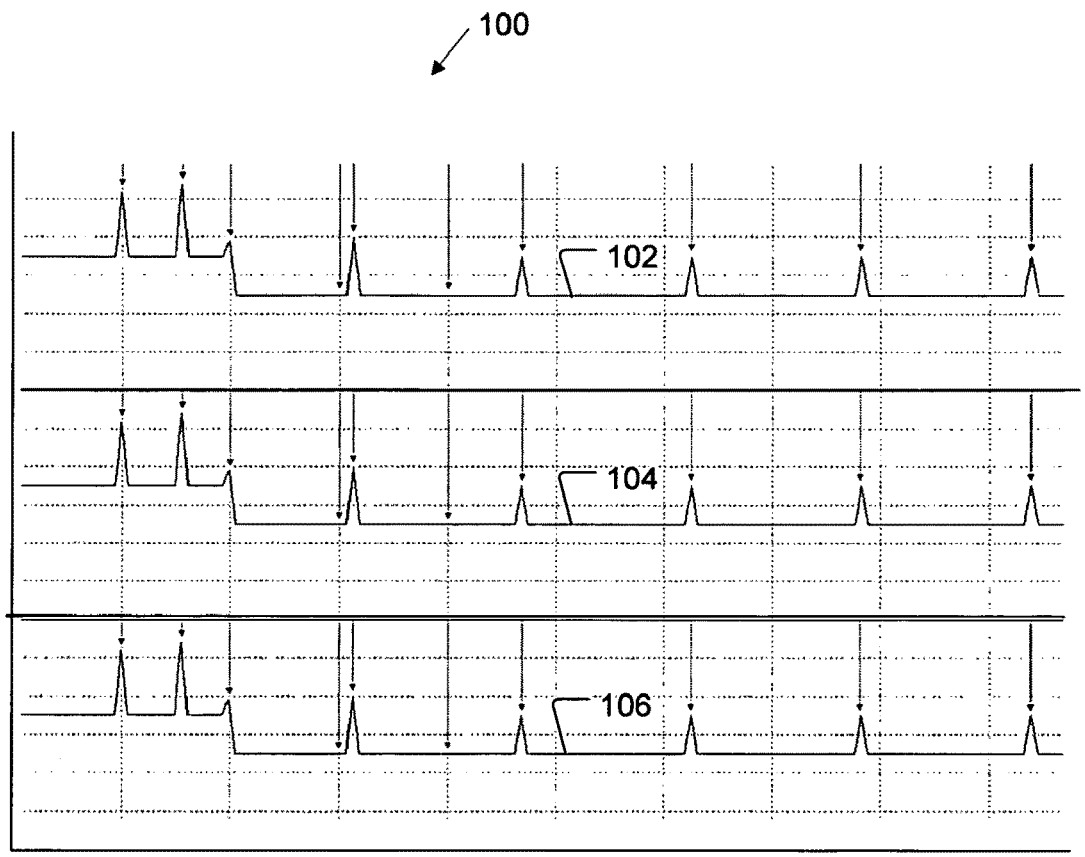
FIG. 1 is a graph of machine vibration baselines synthesized in accordance with an embodiment of the present invention.

In the following description, for purposes of explanation and not limitation, specific details are set forth, such as particular devices, computers, networks, components, techniques, protocols, software products, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known devices, computers, networks, components, techniques, protocols, software products, operating systems, development interfaces, and hardware are omitted so as not to obscure the description of the present invention.

Vibration analysis typically involves comparing measured vibration from a machine with a standard benchmark, datum, or baseline. Some standards are simple, like single values for broad ranges of frequencies. Other standards may consider the machine type and assign values to certain frequency regions based on the machine speed. Full baseline vibration spectra can be quite complex with values derived for a large number of discrete frequencies. For example, there may be arrays of values spanning set frequency ranges. A full test for a machine may include the collection of 12-18 spectra, such as when two frequency ranges are used in 3 directions at 2 or 3 test locations on a machine.

Vibration phenomena seen in spectra such as decaying harmonic series, sidebands, or flow noise are known to vibration engineers. But these nuances are hard to translate on per component and per machine basis. Industry and machinery experience is often required to develop alarm thresholds or baselines for automated systems. The machine vibration baseline synthesizer of the present invention has been developed to synthesize spectra vibration signatures of various machine trains. A benefit of the synthesizer is that it provides an "out of the box" reference that may be used in automated diagnostic systems to screen out faulty machines and accurately diagnose component specific problems. This is especially beneficial for new machines, and new machine models, where historical data is unavailable. Accordingly, rather than require experienced personnel to determine a baseline average vibration or threshold levels for alarms, an operator with little experience may run the baselines synthesizer to screen for faulty machines and to diagnose faults.

According to an embodiment of the present invention, a baseline synthesizer processes machinery technical descriptions (e.g., machine train, components, machine speeds, and test locations) to intelligently compute a set of baseline vibration spectra, mimicking what a vibration test on an ideal fault-free machine of that type would produce. The baseline synthesizer models the effect of vibration generated from background, internal machinery components and vibration excited by nearby connected components. It generates signatures for bearing locations in multiple axes and multiple frequency ranges.

For example, to assist in the determination of machine problems, it is very helpful to have vibration data from each measurement point along three axes—axial, radial, and tangential. Axial is the direction parallel to the shaft in question, radial is the direction from the transducer to the center of the shaft, and tangential is 90 degrees from radial, tangent to the shaft.

FIG. 1 shows a graph 100 of baseline sets of vibrations derived in accordance with an embodiment of the present invention for a given machine. In this example, the baselines are for a motor driving a fan via a belt having a belt ratio of 1.563:1 at a motor speed of 1780 revolutions per minute. In the given example, baselines may be derived for each of multiple locations on the machine. For the motor of this example, it may be desirable to synthesize baselines for vibrations at the motor free end, motor drive end, the fan drive end, and the fan free end. FIG. 1 shows the axial, radial and tangential baselines 102, 104, 106 for vibrations in a low frequency range at the motor free end. The horizontal axis corresponds to frequency. The vertical axis corresponds to vibration amplitude. Baselines may be synthesized for other frequency ranges and locations in accordance with a desired implementation. Further, baselines may be derived for more complex machines having many rotating parts.

Figure 2:
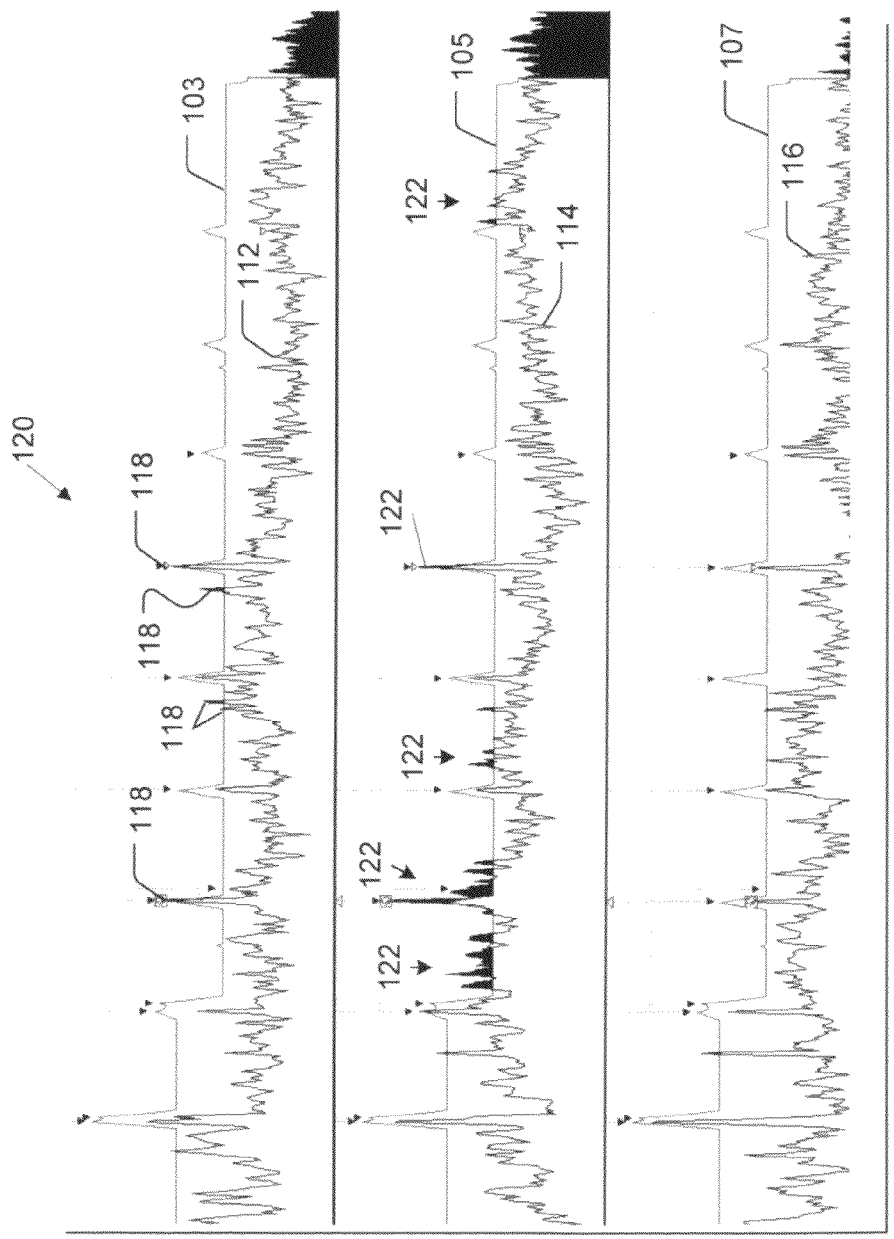
FIG. 2 is a graph of actual machine vibration data and the synthesized vibration baselines of FIG. 1.

FIG. 2 shows a graph 120 of another set of baselines 103, 105, 107 overlaid onto corresponding sets 112, 114, 116 of actual vibration data. The horizontal axis corresponds to frequency. The vertical axis corresponds to vibration amplitude. The actual vibration data was sensed on an actual machine at a given test location and for a specified frequency range. The synthesized baselines 103, 105, 107 are derived for the same test location and the same or an overlapping frequency range. Taking the baselines as being maximums for normal vibration, any peaks where the actual vibration data exceeds the baseline may indicate abnormal vibration. For example the actual axial vibration data 112 at the motor free end in the illustrated example has 5 peaks 118 exceeding the baseline 103. Also, there are several peaks 122 exceeding the baseline 105 for the radial vibration data. With regard to the tangential vibration data in this example, all the actual vibration data peaks within the frequency range of the synthesized baseline 107 are below the baselines 107. In other examples, the positions of the synthesized baseline vibration peaks at the baselines 103, 105, 107 may vary. Of course, the actual vibration data also may vary at different times and for different specimens of the identical machine. In various implementations, the synthesized baselines 103, 105, 107 may serve as alarm limit envelopes, or as a starting point for analysis of fault screening and fault diagnosis.

In some instances, baselines may be derived using machine descriptions which are less than complete. Although the baselines can still provide valuable screening information, in such instances there may be false positives. In the current example, the number of fan blades may be unknown. In such instance, there may be peaks in the actual vibration data exceeding the baseline, because the actual number of fan blades was not considered. A technician viewing the result may quickly recognize the pattern of the actual vibration data as corresponding to a fan with 'y' number of blades and recognize that one or more peaks are due to the unaccounted blade(s), rather than being due to a faulty machine. Accordingly, the results may be considered normal.

Vibration Baseline Synthesis Data and Control Flow

A baseline synthesizer produces a nominal baseline by applying standards developed through empirical and analytical methodology. The purpose is to reliably and effectively estimate baseline spectra for various machine types. Such baselines may be derived without the need for historical vibration data obtained from the same machine or identical machines of the same type. In some applications, the baselines may be derived on the fly during machine screening and diagnostic testing. In other implementations the baselines may be derived and stored for later use.

Figure 3:
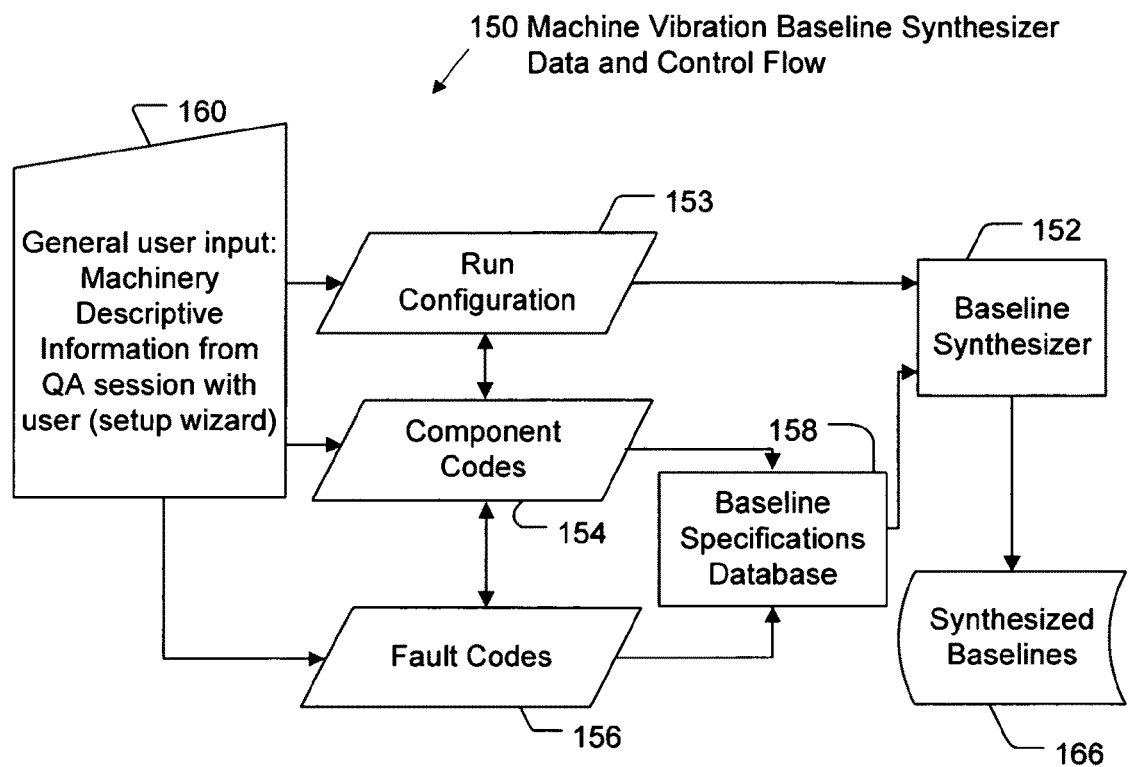
FIG. 3 is a data and control flow diagram for an apparatus for synthesizing machine vibration baselines in accordance with an embodiment of the present invention.

FIG. 3 shows a data and control flow 150 for a baseline synthesizer 152 according to an example embodiment of the present invention. The baseline synthesizer 152 may be implemented in software and executed on a computing system, such as a personal computer, laptop computer, handheld computer, workstation, server, embedded computing device, or other computing device. In some embodiments the baseline synthesizer 152 may be implemented in a network of computing systems. Various memory devices, processors, displays, input devices, and output devices may form all or portions of a computing system implementing the baseline synthesizer 152.

According to an example embodiment of the present invention, the machine vibration baseline synthesizer 152 computes a unique set of spectra for each associated component and bearing within a machine train, and combines the data into a baseline for a given test location and frequency range. The synthesizer 152 receives inputs which identify the machine configuration, (e.g., machine train, components, machine speeds), along with one or more test location and an output frequency range for which baselines are to be derived. For example, an operator may go through an automated interview process or another method to provide input 160 for controlling the baseline synthesizer 152. Various data may be included among or derived from the inputs 160, such as run configuration data 153, component codes 154, and fault codes 156. To process the inputs, a baseline specification database 158 may be accessed.

An operator may specify run configuration data 153, such as the machine model and/or type (e.g., and thus, the machine train information), one or more locations that are to be used on the machine as test locations, and one or more frequency ranges for which the baselines are to be derived. Baselines may be derived for each test location identified by the operator for each frequency range. For example, machine vibration analysis is often performed for both a low frequency range (e.g., 10× the main shaft rpm) and a high frequency range (e.g., 100× the main shaft rpm), although the operator may specify a specific or other frequency range.

The operator also may provide information about the machine configuration, (e.g., motor type, couplings, bearing types, component orientation (vertical/horizontal), component location). For example, by going through an automated question-answer session with the operator/user, a set of component codes 154 may be derived, which identify the respective components to be considered in the synthesis process. The component codes 154 implicitly define many aspects of the machinery being tested. For example, a component code may correspond to a motor with ball bearings driving a fan using a belt. The same physical motor driving a fan with no belt, however, may correspond to a different component code. The specific component code 154 may be obtained by looking up the component code in a database based upon the user responses, or by building a component code based on specific input responses. Component codes 154 may be input to the baseline synthesizer 152 for each component for which vibration contributions are to be factored. In other embodiments, another method may be used for identifying a component to be considered in the baseline synthesis process.

Below is a sample listing of components for which component codes 154 may be included. One of ordinary skill will appreciate that varying numbers and types of components may be included, in accordance with a given implementation of the baseline synthesizer 152.

Component Identification:
AC Line Frequency (50/60 Hz)
Motors
   Horsepower
   AC (VFD)
   DC
Motor Cooling Fan Blades
Flexible Couplings
Close Coupled Units
Gear Boxes: (Single/Double/Multi Speed)
   Gear Tooth Counts
   Gear Ratio's . . .
Belt Drives
   Belt Rate
   Sheave Diameters and Distances . . .
Pumps
   Centrifugal
   Piston . . .
Fans
   Axial
   Centrifugal . . .
Compressors
   Piston
   Rotary Screw . . .
Bearings
   Rolling Element/Journal
   Bearing Locations (tested locations) . . .

Also associated with the machine configuration information provided by operator may be fault codes 156 or other identifying codes. The fault codes 156 are codes for identifying or otherwise indicating forcing frequencies to be accounted for in the baseline synthesis process. In an example embodiment, a fault code may be derived from the machine configuration inputs provided by the operator. By providing information about a component, the machine running speed, and a relation between the component and a machine running speed (e.g., gear ratio), information pertaining to vibration phenomena may be identified. For example, a specific fault code and/or other forcing frequency parameter information may be identified automatically. In other embodiments, the forcing frequencies or other vibration phenomena may be indicated directly or by a method other than by an identification code.

Consider an example in which a fault code relevant to component category T (which may for example be for a positive displacement pump), may be "PP" (i.e., pump pistons), and identify that there are 9 elements, (PP=9). If the fault codes for the machine type include a PP code and the prime component is a Category T, then that order (PP=9) is used as one forcing frequency FF to be included in synthesizing the baseline. Several relevant forcing frequencies may be possible for any one given component category. Further, the fault codes may contain definitions for any number of these forcing frequencies.

Various vibration phenomena creating known patterns in measured spectra may be incorporated into the synthesis process. For example, indicators of vibration phenomena relating to blade pass, belt rate, gear mesh, flow noise, and adjacent components may be incorporated, such as by using forcing frequency parameters. For example, as the data for each component is processed, fault codes determined according to the category of the component may be accessed to identify the forcing frequency(ies) of the component that are applicable for a given machine type. These forcing frequencies may be stored as parameters in the baseline specifications database 158. For example, the fault code and the fault code value may determine a parameter and parameter value to be included in synthesizing a baseline. The parameter values in effect model the common source of vibration. These values are obtained using empirical and analytical methodologies. Accordingly, specific decaying patterns, noise floor levels, and/or sidebands may be factored in based on the component and various forcing frequencies.

Several forcing frequencies may be stored in the baselines specification database 158 for a given category. Forcing frequencies as used herein are the specific frequencies at which a mechanical component will generate forces on a machine. Every rotating component of any machine will produce forces in the machine that will cause vibration at specific frequencies. The specific forcing frequencies are related to the physical makeup of a component. Each component may have one or more forcing frequencies. One of the most significant forcing frequencies is shaft rate, (i.e. revolutions per minute (RPM) of a shaft). This forcing frequency arises due to the residual imbalance that a rotor will always have. Such imbalance imparts a radial centripetal force on the bearings, causing the structure to vibrate at the 1× frequency, also known as the fundamental frequency. This is one of the forcing frequencies. Other forcing frequencies are bearing tones, which are characteristic of each bearing's geometry. Bearing tones are due to forces generated by defects in the races and rolling elements of the bearing itself. Another type of forcing frequency includes the gear tooth-mesh frequencies that arise due to the individual impacts of gear teeth against each other. The tooth-mesh frequency is equal to the number of teeth on the gear times the gear RPM. Another type of forcing frequency includes the vane pass or blade pass frequencies. These are similar to tooth mesh frequencies, and are equal to the number of vanes in an impeller or the number of blades in a fan times the RPM. Each forcing frequency will create a peak in the vibration spectrum. The amplitude of the peak is dependent on the severity of the condition that causes it. Thus the frequency where the peak occurs indicates the type of problem and the amplitude of the peak indicates the problem severity.

The baseline specification database 158 may be embodied in a file structure, or other data structure. In an example embodiment, the baseline specification database may include a plurality of parameters for each of multiple categories. Each row in the database (or line in the file), for example, may correspond to a category. Each column may correspond to a parameter. Each component may be of a certain category. Example categories may include one or more categories of motors, gear boxes, bearings, compressors, fans, pumps, belt drives, motor cooling fan blades, flexible couplings, and close coupled units. Other categories may be defined. Thus, inputs 160 that relate to a specific component may be used to identify a component code, which in turn may lead to identification of a category.

In various embodiments, the number of parameters and the specific parameters may vary. In one embodiment there may be a common set of parameters for each category. In another embodiment, there may be differing sets of parameters associated with differing categories. In a specific embodiment of the baseline specifications database 158, there are several parameters for each given category, although not all parameters need be used, or include valid data. Following is a list of an example list of parameters stored for each category in an example embodiment: 1X, 2X, 3X, 4X, 5X, 6X, 7X, 8X, 9X, 1xFF, 2-3xFF, 4-12xFF, fixed freq, floor1, floor2, floor3, floor4. With regard to parameters, X refers to the main shaft RPM for the categorized component. Thus, 1X to 9X refer to harmonics of the main shaft. "FF" stands for fault code forcing frequency and may refer to any of various forcing frequencies, such as for motor bars, pump vanes, compressor pistons, gear mesh, etc. The specific fault code determines the type of forcing frequency that is stored in the baseline specifications database for a given category.

The floor values may be defined as follows: floor1 covers 0-2X rotational rate, floor2 covers 2X-10X, floor3 covers 10X-40X, and floor4 covers 40X-100X, where X refers to the shaft rate of the categorized component. In some embodiments, additional parameters may be included, such as for forcing frequencies of sidebands. Specifically, an amplitude for a fundamental forcing frequency that generates sidebands may be specified as one parameter. In addition, parameters may be included for vibration amplitudes at various sidebands, (e.g., first sidebands, second sidebands, twelfth sidebands). The spacing of the sidebands may be derived from the machinery descriptive information provided by the operator. For example, the gear ratio for a component may determine at least in part the sideband spacing for sideband parameters stored for a given component category.

The value stored in the baseline specifications database 158 for a given parameter may be a vibration amplitude for a specific order of frequency. Specifically, the frequency for a given parameter may be based upon the rotation rate, X, and the various orders of X, or upon a forcing frequency and various orders of the forcing frequency, while the stored value corresponds to a peak amplitude at that frequency. These amplitudes are precompiled and stored in the baseline specifications database 158 using empirical and analytical methodologies.

Given the component codes 154 which represent a model describing the kind of machine, the fault codes 156 which define the known vibration sources inside the machine, and the baseline specification database 158 of parameters, the baseline synthesizer 152 constructs a useful estimate of the machine's vibration signature. In particular, vibration amplitude floor values, vibration amplitude peaks at operating speed harmonics, and vibration amplitude peaks at forcing frequencies may be selectively read or computed from entries in the baseline specifications database 158. This estimate of the machine's vibration signature resembles the average baseline derived from actual historical vibration data, but is derived without the need for actual historical vibration data. FIG. 1, as previously discussed, shows an example of synthesized baselines 102, 104, 106 in graph format. Such baselines were derived based upon the following input derived from user input 160: test locations; machinery speed; arrangement of machinery component types such as electric motors, centrifugal pumps, couplings, fans, belt drives, gear trains, compressors, et cetera; transmission type such as belts drive, gear drive or both; and transmission ratio.

One of ordinary skill will appreciate that the synthesized baselines 166 (see FIG. 3) may be output in various formats, and that the specific output will vary depending on the machine for which the baselines are being derived.

Vibration Baseline Synthesis Method

Figure 4:
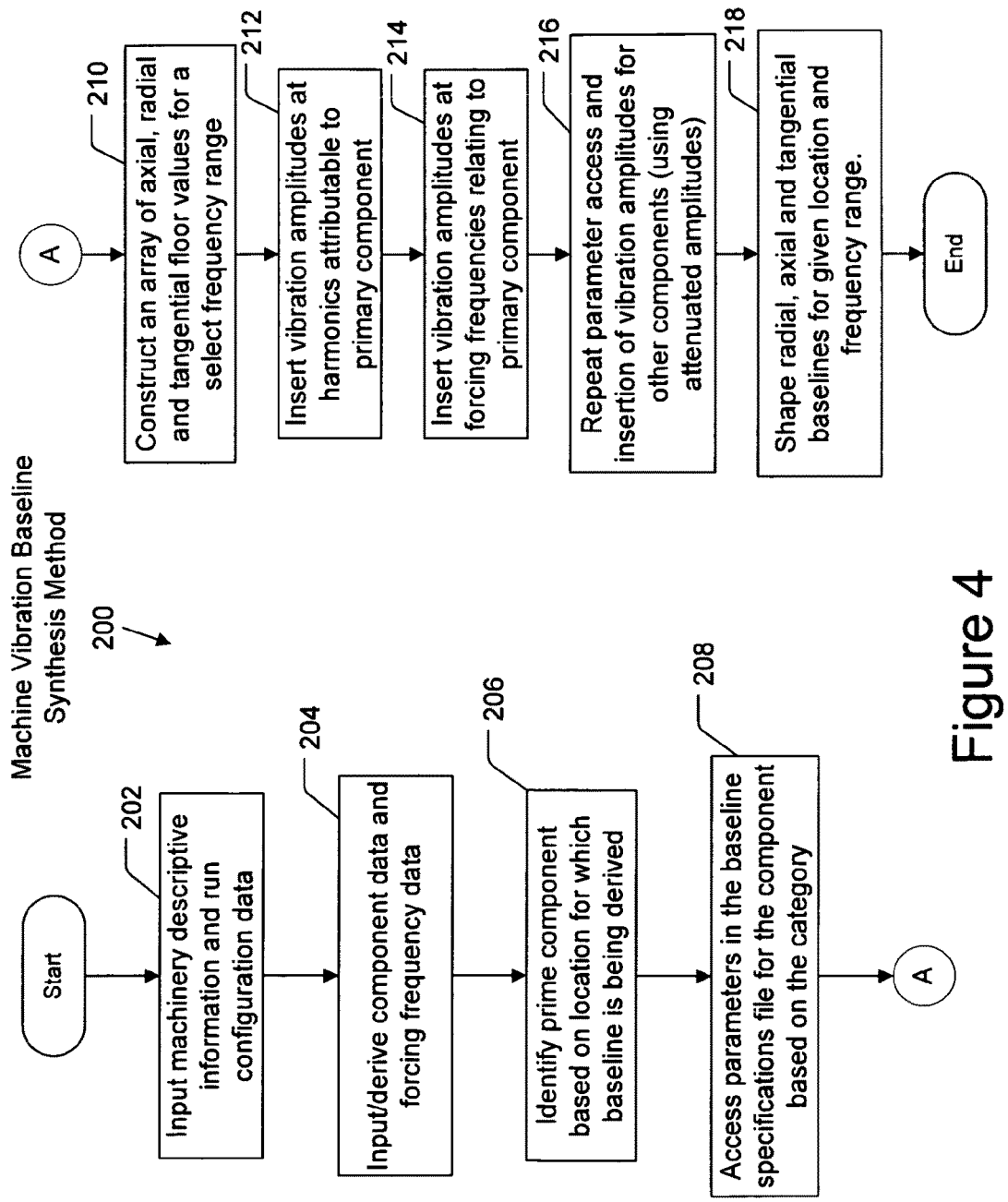
FIG. 4 is a flow chart of a method of synthesizing machine vibration baselines in accordance with an embodiment of the present invention.

FIG. 4 shows processes performed as part of a method 200 for synthesizing machine vibration baselines, according to an example embodiment of the present invention. The method 200 may be performed for any given machine, for various locations on the machine, for various frequency ranges, and encompass the impacts from various components. At step 202, machinery descriptive information (e.g., drive train, components, machine speeds) and run configuration data (e.g., test location, frequency range), may be obtained from an operator (or another source, such as a diagnostic screening system). At step 204, the machinery descriptive information may be processed to derive component data and forcing frequency data. For example, the component codes 154 and the fault codes 156 may be derived, such as by a process described above with regard to the data and control flow of FIG. 3. The component codes and fault codes form a simple model of the machine for which vibration baselines are being derived. Each test location corresponds to a location on the machine for which baselines are to be synthesized. A given test location corresponds to the location where a sensor would be placed if measuring actual vibration data. The frequency range determines the output range for the synthesized baselines, (e.g., baselines for a low frequency range; baselines for a high frequency range; baselines for a specific frequency range). By including a test location and frequency range, the synthesized baselines may be used for comparing and analyzing actual machine vibration data over the specified frequency range obtained from a sensor at the test location. Generally, the specified location is at a bearing, such as a driven end or free end of a shaft. However, other locations may be specified.

At step 206, the test location, drive train and components data are examined to identify the component that is to be treated as a prime component for the analysis at the test location. For example, the component at or near the location that is expected to impart the most vibration may be selected as the prime component.

At step 208, parameters may be loaded from the baselines specifications database 158 for the prime component. For example, a category of the prime component may be identified, and the data for such category retrieved from the baselines specifications database 158. In some embodiment, the category may be looked up in a database based upon the specific component code. In other embodiments the components code may logically relate to the category and be parsed or otherwise processed to identify the category. FIG. 5 shows an example table relating components 172 to the category codes 174, along with potential fault codes. All the data used to determine the category code is obtained among the inputs 160 from the machine operator. One of ordinary skill will appreciate that the data listed in FIG. 5 is not an exhaustive list of components, categories, or fault codes. The specific components, codes and number of codes may vary.

In a specific embodiment, a baseline may be formed as a set of array of elements. For example, a 500 element array may be created for a given baseline. At step 210, an array of elements corresponding to axial, radial and tangential frequencies may be constructed for a select frequency range. A starting point may be to set vibration floor values for elements within specific frequencies. A floor value is the minimum amplitude value in a specific frequency region for considering vibration significant. Amplitudes below the floor value of a specific region are not considered significant (e.g., correspond to normal vibration levels). Each floor value corresponds to a given frequency range. Thus, over the specified frequency range for the axial baseline, one floor value may correspond to a first portion of the baseline, a second floor value may correspond to a second portion of the baseline, and so on for the entire frequency range of the baseline. The floor values are obtained from the parameters read from the baselines specifications file 156 for the category of the prime component. Specific noise floor values at 0-2X, 2x-10x, 10x-40x and 40x-100x may be used, where x corresponds to the running speed of the prime component. Baselines may be started for each of the axial, radial and tangential baselines in the same manner using the floor values.

At step 212, vibration amplitudes may be set for specific harmonic frequencies relating to the prime component. For example, amplitudes may be stored in the baselines specification database 158 for the prime component's category for various orders of harmonics. An amplitude may be read for the 1X parameter and be set at the array element corresponding to the specific running speed frequency (i.e., 1X) of the prime component. Note that although the running speed may vary at different times, the amplitudes are associated with frequency orders of the running speed. Similarly, for each of the harmonics of the running speed, other amplitudes may be read from the baseline specification database 158 and set as the vibration amplitudes for the corresponding array elements.

At step 214, vibration amplitudes may be set for various forcing frequencies associated with the prime component. For example, forcing frequencies, or fault codes, may have been identified at step 204. Consider an example, in which a specific fault code 'PP' (i.e., pump pistons) is identified, along with a value for the fault code, '9' for the prime component. The fault code 'PP' indicates that the parameters for the forcing frequencies are to be accessed for the prime component category in the baseline specifications database. The fault code value, 9, indicates that this value coincides with (and will replace) the $9^{th}$ harmonic. Thus, the value set in step 212 for the 9X frequency is to be replaced with the value read for the 1XPP forcing frequency. Further, the value set in step 212, if applicable, for the 18X frequency is to be replaced with the 2XPP forcing frequency. Similarly, the amplitude each multiple of the gth order frequency is replaced with the corresponding nth order forcing frequency. In some embodiments, fault codes also may encompass sideband forcing frequencies. In such example, the sideband spacing is derived at step 204 based on the machinery description and component data, (e.g., may be derived from the gear ratio pertinent to the component). Thus, a sideband fault code identifies that amplitudes are to be set at sideband forcing frequencies. The value of the fault code determines the center frequency. For example, it may be 5 and thus correspond to the array element set in step 212 for the $5^{th}$ harmonic. The amplitude for the sideband may be read from the baseline specifications database 158 for the component category and set at the frequency corresponding to the 5X harmonic. Consider an example in which the spacing is determined to be 0.5. The amplitude for the +/−1 sideband forcing frequency may be read from the baseline specifications database 158 at set at the frequency 4.5X and 5.5X. The amplitude for the +/−2 sideband forcing frequency may be read from the baseline specifications database 158 at set at the frequency 4.0X and 5.0X. Note that for some of these steps, the corresponding array element may be previously set to a floor value, which now is being replaced. A similar process is repeated for each of multiple sideband forcing frequencies encompassed by the fault code. Accordingly, various harmonic and sideband decay patterns may be considered according to the fault codes, such as the 2x-3x forcing frequency harmonics (and/or sidebands) and the 4x-12x forcing frequency harmonics (and/or sidebands).

At step 216, amplitudes may be set for additional array elements based upon the vibration impacts attributable to the other components specified in the inputs at step 202, 204. These components are considered non-prime components. The processes performed are similar to those described with regard to steps 208, 212 and 214. For example, a category for each one of the non-prime components may be obtained in the same manner as for the prime component, and corresponding parameters for that category may be read from the baseline specifications database 158. Like in step 212, additional amplitudes may be inserted into the array at the various fundamental frequencies and harmonics for each non-prime component. Also, like in step 214, vibration amplitudes may be set for various forcing frequencies associated with the non-prime components. For example, there may be fault codes that were indicated for any one or more of these non-prime components. Accordingly, the parameters corresponding to these fault codes may be accessed to define additional vibration amplitude values to be inserted into the array.

Also of note is that the shaft rate of the non-prime components may differ from that of the prime component. Accordingly, the peaks for the non-prime components are not likely to coincide with the peaks caused by the prime component. Thus, when inserting these attenuated peaks into the array the amplitude first is compared to the array element amplitude (e.g., a floor value when not coinciding with a prime component peak). If the non-prime component peak is less than the floor value, it is ignored. If it exceeds the floor value, then it replaces the floor value in the array. Shaping of these additional peaks is performed using a similar shaping process as for the prime component peaks.

The processes performed in step 218 differ from those in steps 212 and 214 with regard to the amplitude being stored in the array. In particular, attenuation may be accounted for high frequency and low frequency transmission loss across components. The impact of these components is attenuated because the contribution is not on the subject prime component, but instead is contributed via a transferral from another component. Accordingly, the amplitude stored in the array for a non-prime component is attenuated by a nominal value. In one embodiment, the value of the appropriate parameter read from baseline specification database for the non-prime component category may be multiplied by an attenuation factor or otherwise be decreased by a nominal attenuation. In other embodiments, a specific attenuation may be derived for a given component based upon a force transferrance path between the component and the prime component.

At step 218, a shaping process may be performed on the array elements to shaping the baselines. In an example embodiment amplitudes for array elements adjacent to the specific array element set at steps 212, 214 may be shaped by any of various processes. For example, an amplitude at a specific array element may be shaped over a predefined number of elements with the specific frequency corresponding to the center element. The peak may be given various shapes, such as a flat top, or be pointed. In one embodiment, the peak drops by one third (of the difference between the peak and the floor value) at the adjacent element on each side, and by ⅔ at the next adjacent element on each side, so that the third adjacent element is back down to the floor value for that region of the baseline.

At step 218, the array may be formatted for output for each of the axial, radial and tangential baselines corresponding to the test location of the specified machine configuration. The array data may be used for various purposes and may be output in various formats. FIG. 1 shows an example of a graph of the axial, radial and tangential baselines for a given test location of a given machine over a given frequency range.

Machine Fault Screening and Diagnostic System

The machine vibration baseline synthesizer 152 may be used with or as part of a machine screening system and/or a machine fault diagnostic system 302. The fault diagnostic system 302 may be implemented in software and executed on a computing system, such as a personal computer, laptop computer, handheld computer, workstation, server, embedded computing device, or other computing device. In some embodiments the fault diagnostic system 302 may be implemented in a network of computing systems. Various memory devices, processors, displays, sensors, input devices, and output devices may form all or portions of a computing system implementing the fault diagnostic system 302.

The machine fault diagnostic system 302 may be used as part of a predictive maintenance program to perform screening or other fault diagnostic processes on a machine. Predictive maintenance utilizes many different disciplines. By far the most significant portion which helps to identify faults is periodic vibration analysis. Of all the non-destructive testing that can be done on a machine, the vibration signature provides the most pertinent information about its inner workings. Accordingly, when screening identifies machines that may have faults, fault diagnostics may be performed, such as to identify source(s) of wear, imbalance, misalignment, mechanical looseness or electrically-induced vibration. In some instances baselines may be available that are statistically averages based on historical data measured by sensors on the machine or an identical machine of the same type. In such case, the fault diagnostic system 302 may use baselines derived from historical data. In other instances, such as for new machines or new models of machines, there may not be applicable historical data. Further, in some shops the machine operator may not have the expertise to create a statistical average of historical data, (e.g., may not be able to normalize the data or otherwise make data for a given measurement session comparable with other data). In these instances, the machine fault diagnostic system 302 may request or access the synthesized baselines derived according to an embodiment of this invention.

Figure 6:
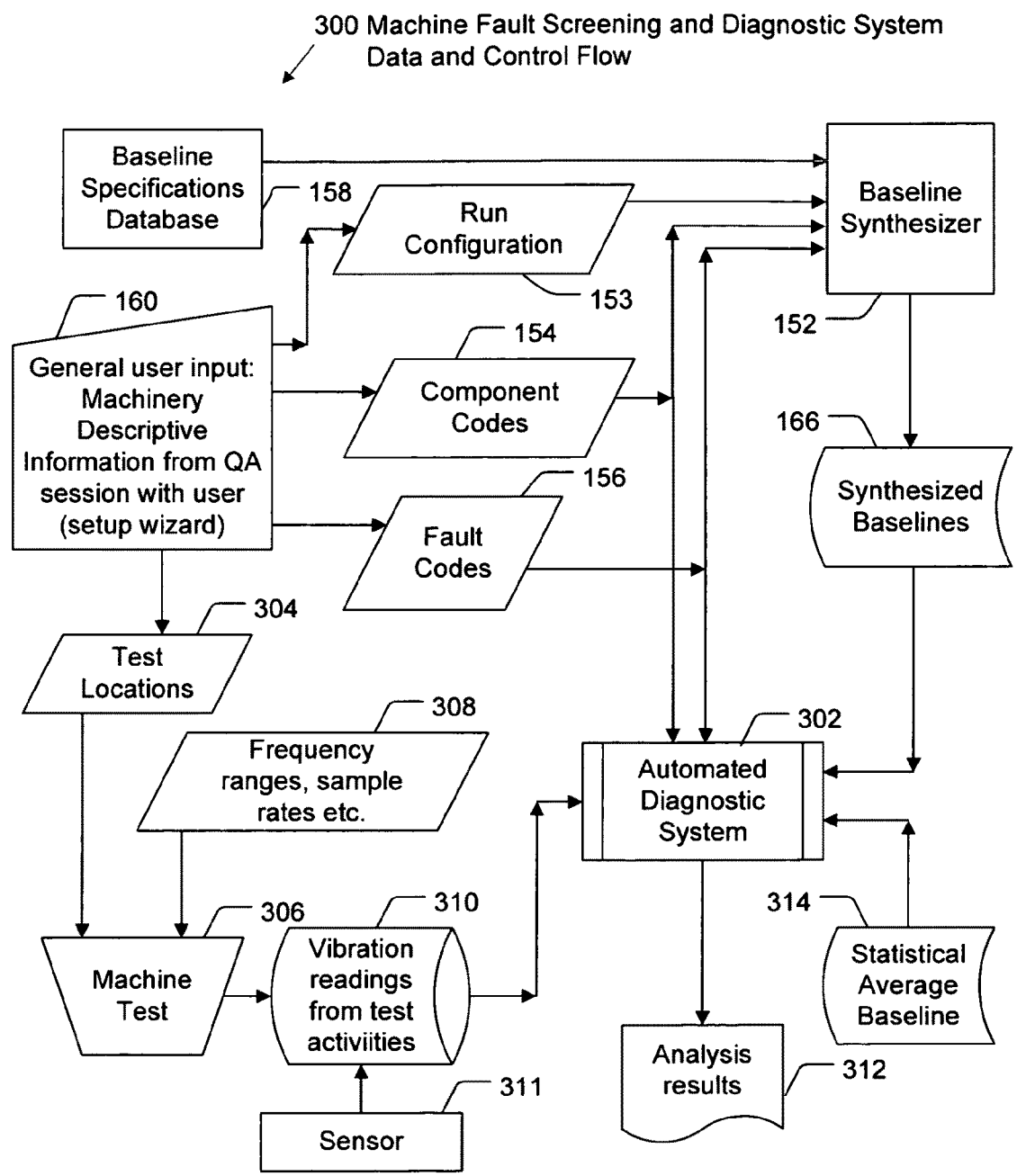
FIG. 6 is a data and control flow diagram for a system for screening and diagnosing faults in accordance with an embodiment of the present invention.

FIG. 6 shows a data and control flow diagram for such a system 302 including the baseline synthesizer 152, in accordance with an embodiment of the present invention. Like items and components are given the same part numbers and provide the same or similar content and function as described above for the baseline synthesizer flow of FIG. 3. When performing machine screening, a vibration sensor 311 may be placed at each of one or more test locations 304. Such locations are input to the baseline synthesizer 152 based upon the user inputs 160. In some embodiments, these locations may be detected and thus, directly input to the baseline synthesizer without requiring an operator to specify the location.

When setting up the machine test 306, various frequency ranges and sampling rates 308, and other test parameters also may be specified. During the test, various vibration readings 310 are input to the automated diagnostic system 302. The automated diagnostic system 302 compiles, transforms and processes the frequency readings to generate machine vibration spectra. These vibration spectra may be compared with the synthesized baselines to determine whether faults are present. FIG. 2 shows an example in which actual machine vibration spectra 112, 114, 116 for axial, radial and tangential vibration are compared with synthesized baselines 103, 105, 107 for the same test location and the same or an overlapping frequency range. In some cases, an alarm condition or fault may be indicated when the actual data exceeds the baseline, or when the actual baseline exceeds the baseline by a threshold amount. In some cases, the pattern of the actual data relative to the baselines may be indicative of a certain type of fault. For instance, an increase at a 1X frequency of a motor bearing may indicate an increasing imbalance condition. If harmonics of 1X begin to appear, this is an indication of damage, such as bearing clearance increases, looseness, or cracking of the structure. Accordingly, a strong 1X vibration may indicate that the rotor should be balanced, while the appearance of harmonics of 1X may indicate that the bearing and surrounding structure should be inspected for damage. The analysis of the actual vibration data in comparison with the synthesized baselines may yield results 312 which are output, displayed, and/or stored.

Note that conventional diagnostic systems may use historical data to form statistical average baselines 314 for comparison with actual test data derived from readings 310. The system of this invention, however, uses synthesized baselines 166 based upon machine configuration data 160 input by a user and a baseline specification database 158 derived using empirical and analytical methodologies. In some embodiments, the automated diagnostic system may process the actual readings 310 and determine that the statistical average baselines 314 are not available. In such case, the system 302 may instead request synthesized baselines 166 be generated by the baseline synthesizer 152.

Machine Fault Screening Method

Figure 7:
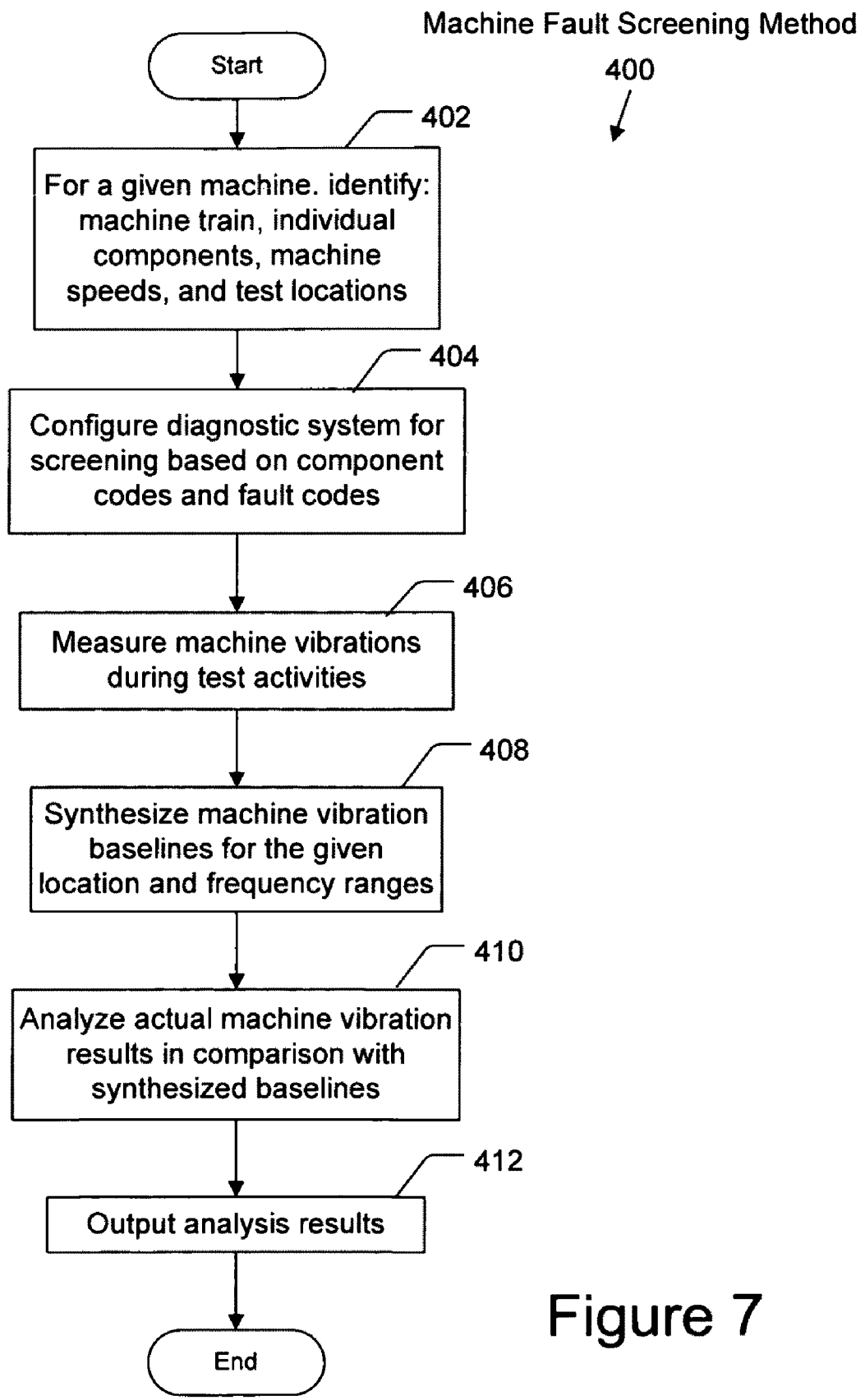
FIG. 7 is a flow chart of a method for screening and diagnosing faults, in accordance with an embodiment of the present invention.

FIG. 7 shows a flow chart of a process 400 for screening a machine for vibration faults. At step 402, the machine train, components, machine speeds, and test locations 304 are identified for a given test 306 on a given machine. Such test locations 304 and frequency ranges may be input to the baseline synthesizer 152 and an automated diagnostic screening system 302. At step 404, the diagnostic system is configured for screening based upon the component codes 154 and faults codes 156 obtained from the operator inputs 160. For example, frequency ranges, sampling rates and other parameters 308 may be identified. At step 406, vibration readings 310 are obtained by the automated diagnostic system 302. At step 408, the baseline synthesizer 152 executes the method 200 to synthesize baselines for the machine test. At step 410 the actual readings 310 are received, transformed and processed to derive frequency data that may be compared with the synthesized baselines 166. The derived frequency data and the synthesized baselines are analyzed to perform a desired screening operation, such as to screen for a select set of fault conditions. At step 412 the analysis results are output.

One of ordinary skill will appreciate that the order of these steps may vary. For example, all of the steps pertaining to obtaining the synthesized baselines may be performed prior to any testing and stored in a database for later retrieval by the automated diagnostic system. In another embodiment, the steps pertaining to obtaining the synthesized baselines may be performed before or concurrent with obtaining the actual data measurements. For example, the automated diagnostic system may send a request to the baseline synthesizer at any step during the process of testing a machine. Accordingly, in some embodiments the location, frequency range, component codes and fault codes may be indicated by the automated diagnostic system, or retrieved from memory.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of synthesizing a vibration baseline for a machine for use in diagnosing vibration of the machine without using historical vibration data measurements of said machine nor an identical machine, the method being performed by a computing system having a processor and memory, comprising:

receiving into memory machine configuration data;

processing by the processor the machine configuration data to identify a prime component, one or more other components, and one or more forcing frequency indicators of the machine for which the vibration baseline is to be synthesized;

accessing a baseline specification database stored in memory to obtain parameters for deriving the vibration baseline from the identified prime component, one or more other components, and one or more forcing frequency indicators, wherein the baseline specification database comprises a plurality of parameters for each of a plurality of machine component categories, the plurality of parameters for at least one category comprising multiple harmonic frequencies and multiple forcing frequencies, wherein all content of the baseline specification database is derived without any of said historical vibration data measurements;

formulating said vibration baseline for the machine without using historical vibration data measurements of said machine, said formulating comprising;

setting by the processor first vibration amplitude values of the machine vibration baseline at prime component harmonic frequencies, wherein the prime component harmonic frequencies are determined at least in part from content of the baseline specification database according to the identification of the prime component;

setting by the processor second vibration amplitude values of the machine vibration baseline at other component harmonic frequencies based at least in part from content of the baseline specification database according to the identification of said one or more other components; and setting by the processor a third vibration amplitude value of the machine vibration baseline at a forcing frequency based at least in part from content of the baseline specification database according to one of said one or more forcing frequency indicators.

2. The method of claim 1, further comprising: setting by the processor respective vibration amplitude floor values for at least a first and a second frequency range of the baseline based at least in part from content of the baseline specification database according to the identification of the prime component.

3. The method of claim 1, wherein said step of receiving comprises receiving into memory machine train data, component data and machine speed data, and wherein said setting first vibration amplitude values are based at least in part from content of the baseline specification database according to the identification of the prime component and the received machine speed data.

4. The method of claim 1, further comprising receiving into memory a test location, wherein the prime component is identified based at least in part on the test location.

5. The method of claim 1, wherein said one or more forcing frequency indicators comprises blade pass.

6. The method of claim 1, wherein said one or more indicators of vibration comprises gear mesh.

7. The method of claim 1, wherein said one or more indicators of vibration comprises a bearing tone.

8. The method of claim 1, wherein said one or more indicators of vibration comprises a belt rate.

9. The method of claim 1, wherein said one or more indicators of vibration comprises flow noise.

10. The method of claim 1, wherein said one or more indicators of vibration comprises a harmonics decay pattern.

11. The method of claim 1, wherein said one or more indicators of vibration comprises a sideband decay pattern.

12. The method of claim 1, further comprising accessing with the processor, based upon the identification of the prime component, a plurality of parameters to be used for deriving portions of the baseline, wherein said plurality of parameters are used for said setting said first vibration amplitude values and said third vibration amplitude value.

13. The method of claim 1, further comprising shaping with the processor the baseline in the vicinity of said first vibration amplitude values and said second vibration amplitude values.

14. The method of claim 1, further comprising processing with the processor the machine configuration data to identify a first code for the prime component, respective second codes for each one of the one or more other components, and respective third codes for each one of the identified one or more forcing frequency indicators, wherein the first code, respective second codes, and respective third codes are used to access vibration parameters from the baseline specification database for use in synthesizing the machine vibration baseline.

15. A method for screening a machine with a diagnostic system having a processor, memory, and one or more sensors, comprising:
  identifying by the processor machine train, components, machine speed and test location for the machine based on input data;
  configuring with the processor a diagnostic system for screening the machine;
  measuring with said one or more sensors actual machine vibration data generated by the machine;
  generating with the processor the machine vibration baseline from said historical vibration data when available;
  synthesizing by the processor the machine vibration baseline without said historical vibration data when said historical vibration data is not available; and
  analyzing with the processor the actual machine vibration data, wherein said analyzing comprises accessing the machine vibration baseline; and
  wherein said synthesizing synthesizes the machine vibration baseline within a frequency range for the test location without averaging historical vibration data from either one or both of the machine and an identical machine, and comprises:
  accessing a baseline specification database stored in memory to obtain parameters for deriving the machine an vibration baseline, wherein the baseline specification database comprises a plurality of parameters for each of a plurality of machine component categories, the plurality of parameters for at least one category comprising multiple harmonic frequencies and multiple forcing frequencies, wherein all content of the baseline specification database is derived without any of said historical vibration data; and
  setting a baseline vibration amplitude value for at least each one of a harmonic frequency and a forcing frequency that are based at least in part on identification of a prime component.

16. The method of claim 15, in which said synthesizing comprises:
  receiving into memory machine configuration data;
  processing with the processor the machine configuration data to identify the prime component, one or more other components, and one or more forcing frequency indicators;
  setting by the processor a first vibration amplitude value of the machine vibration baseline at said harmonic frequency;
  setting by the processor second vibration amplitude values of the machine vibration baseline at harmonic frequencies within the baseline based at least in part on the identification of said one or more other components; and
  setting by the processor a third vibration amplitude value of the machine vibration baseline at said forcing frequency based at least in part on one of said one or more forcing frequency indicators associated with the prime component.

17. The method of claim 16, further comprising: setting by the processor respective vibration amplitude floor values for at least a first and a second frequency range of the baseline based at least in part on the identification of the prime component.

18. The method of claim 16, further comprising identifying with the processor, based upon the identification of the prime component, a plurality of parameters to be used for deriving portions of the baseline, wherein said plurality of parameters are used for said setting said first vibration amplitude values and said third vibration amplitude value.

19. An apparatus for synthesizing a machine vibration baseline within a frequency range for a test location of a machine without averaging historical vibration data from either one or both of the machine and an identical machine, comprising:
  means for inputting machine configuration data;
  processing means for processing the machine configuration data to identify a prime component, one or more other components, and one or more forcing frequency indicators of the machine for which the vibration baseline is to be synthesized;
  a baseline specification database comprising a plurality of parameters for each of a plurality of machine component categories, the plurality of parameters for at least one category comprising multiple harmonic frequencies and multiple forcing frequencies, wherein all content of the baseline specification database used for synthesizing a first machine vibration baseline is not based on any historical vibration data obtained from the machine nor an identical machine;
  processing means for setting first vibration amplitude values of the first machine vibration baseline at prime component harmonic frequencies, wherein the prime component harmonic frequencies are determined at least in part from content of the baseline specification database according to the identification of the prime component;
  processing means for setting second vibration amplitude values of the first machine vibration baseline at other component harmonic frequencies based at least in part from content of the baseline specification database according to the identification of said one or more other components; and processing means for setting a third vibration amplitude value of the first machine vibration baseline at a forcing frequency based at least in part from content of the baseline specification database according to one of said one or more forcing frequency indicators.

20. The apparatus of claim 19, further comprising:

processing means for setting respective vibration amplitude floor values for at least a first and a second frequency range of the baseline based at least in part on the identification of the prime component.

21. The apparatus of claim 19, further comprising memory for storing vibration amplitude values for rotational speed harmonics, forcing frequencies and other vibration parameters from which said first vibration amplitude values, said second vibration amplitude values, and third vibration amplitude value are derived, wherein said values stored in memory are obtained without averaging historical vibration data from said machine.

22. A diagnostic testing system for screening a machine, comprising:

means for receiving machine train, components, machine speed and test location data for the machine;

a baseline specification database comprising a plurality of parameters for each of a plurality of machine component categories, the plurality of parameters for at least one category comprising multiple harmonic frequencies and multiple forcing frequencies, wherein all content of the baseline specification database used for synthesizing a first machine vibration baseline is not based on any historical vibration data obtained from the machine nor an identical machine;

sensors for measuring actual machine vibration data generated by the machine;

a machine vibration baseline generator for generating a second machine vibration baseline from said historical vibration data when said historical vibration data is available for either the machine or an identical machine, and for synthesizing said first machine vibration baseline without said historical vibration data when said historical vibration data is not available, said first machine vibration baseline being within a frequency range for the test location and being based on content from the baseline specification database as selected based upon the received components data and without averaging historical vibration data from either one or both of the machine and an identical machine, wherein said synthesizing comprises setting a baseline vibration amplitude value for at least each one of a harmonic frequency and a forcing frequency that are based at least in part on parameters read from the baseline specification database and identification of a prime component; and processing means for analyzing the actual machine vibration data, wherein said processing means accesses the synthesized first machine vibration baseline.

23. The system of claim 22, wherein said machine vibration baseline generator comprises:

means for inputting machine configuration data;

processing means for processing the machine configuration data to identify a prime component, one or more other components, and one or more forcing frequency indicators;

processing means for setting first vibration amplitude values of the first machine vibration baseline at prime component harmonic frequencies, wherein the prime component harmonic frequencies are determined at least in part from content of the baseline specification database according to the identification of the prime component;

processing means for setting second vibration amplitude values of the first machine vibration baseline at other component harmonic frequencies based at least in part from content of the baseline specification database according to the identification of said one or more other components; and processing means for setting a third vibration amplitude value of the first machine vibration baseline at a forcing frequency based at least in part from content of the baseline specification database according to one of said one or more forcing frequency indicators.

24. The apparatus of claim 23, further comprising:

processing means for setting respective vibration amplitude floor values for at least a first and a second frequency range of the baseline based at least in part on the identification of the prime component.

25. The apparatus of claim 23, further comprising memory for storing vibration amplitude values for rotational speed harmonics, forcing frequencies and other vibration parameters from which said first vibration amplitude values, said second vibration amplitude values, and third vibration amplitude value are derived, wherein said values stored in memory are obtained without averaging historical vibration data from said machine.

* * * * *